(12) United States Patent
Schuller

(10) Patent No.: US 11,389,676 B2
(45) Date of Patent: Jul. 19, 2022

(54) AIR PURIFIER APPARATUS WITH FLEXIBLE FILTER MODULES

(71) Applicant: Carmen Schuller, New York, NY (US)

(72) Inventor: Carmen Schuller, New York, NY (US)

(73) Assignee: Carmen Schuller, Mooresville, NC (US)

( * ) Notice: Subject to any disclaimer, the term of this patent is extended or adjusted under 35 U.S.C. 154(b) by 1264 days.

(21) Appl. No.: 15/296,725

(22) Filed: Oct. 18, 2016

(65) Prior Publication Data

US 2018/0104517 A1 Apr. 19, 2018

(51) Int. Cl.
*A62B 23/02* (2006.01)
*A62B 9/00* (2006.01)
*A62B 7/02* (2006.01)
*A62B 7/10* (2006.01)
*A62B 9/02* (2006.01)
*A62B 18/02* (2006.01)
*A62B 18/08* (2006.01)
*B01D 53/22* (2006.01)

(52) U.S. Cl.
CPC ............... *A62B 23/02* (2013.01); *A62B 7/02* (2013.01); *A62B 7/10* (2013.01); *A62B 9/006* (2013.01); *A62B 9/02* (2013.01); *A62B 18/025* (2013.01); *A62B 18/088* (2013.01); *B01D 53/22* (2013.01); *B01D 2258/06* (2013.01); *B01D 2259/4541* (2013.01)

(58) Field of Classification Search
CPC ........... A62B 7/10; A62B 23/02; A62B 9/006; A62B 18/088; B01D 2258/06; B01D 2259/4541; B01D 53/22; B01D 35/30; A61M 16/107; A61M 16/06; A61M 16/00; A61M 16/1045
See application file for complete search history.

(56) References Cited

U.S. PATENT DOCUMENTS

| | | | |
|---|---|---|---|
| 2,332,662 A | 10/1943 | Nathanson | |
| 3,713,440 A | 1/1973 | Nicholes | |
| 4,233,972 A | 11/1980 | Hauff et al. | |
| 4,240,417 A * | 12/1980 | Holever | A61M 16/0465 128/203.12 |
| 4,267,653 A | 5/1981 | Hashino et al. | |
| 4,331,141 A | 5/1982 | Pokhis | |
| 5,009,225 A | 4/1991 | Vrabel | |
| 5,032,269 A * | 7/1991 | Wollbeck | B01D 63/021 210/321.8 |

(Continued)

FOREIGN PATENT DOCUMENTS

| | | | |
|---|---|---|---|
| EP | 0856328 A2 * | 8/1998 | ......... A61M 16/105 |
| EP | 0856328 A2 | 8/1998 | |
| GB | 751223 A | 6/1956 | |

OTHER PUBLICATIONS

International Search Report and Written Opinion in corresponding PCT Application No. PCTUS17/30521, dated Aug. 7, 2017.

*Primary Examiner* — Victoria Murphy
(74) *Attorney, Agent, or Firm* — Leason Ellis LLP

(57) ABSTRACT

The invention relates to a modular, portable, air purifier device capable of supplying filtered or otherwise conditioned airflow to an individual. More specifically, the present invention provides an air purification system that allows for the remote detection and analysis of local ambient air quality and transmit that information to wirelessly connected devices.

11 Claims, 11 Drawing Sheets

(56) References Cited

U.S. PATENT DOCUMENTS

| | | | |
|---|---|---|---|
| 5,267,557 A | 12/1993 | Her-Mou | |
| 5,848,592 A | 12/1998 | Sibley | |
| 5,878,742 A | 3/1999 | Figuereo et al. | |
| 6,772,762 B2 | 8/2004 | Piesinger | |
| 2005/0001728 A1* | 1/2005 | Appelt | G08B 21/02 |
| | | | 340/573.1 |
| 2005/0056284 A1* | 3/2005 | Rascoe | A61M 16/06 |
| | | | 128/204.26 |
| 2011/0247620 A1* | 10/2011 | Armstrong | B01D 53/047 |
| | | | 128/204.23 |
| 2013/0037027 A1* | 2/2013 | Schuller | A62B 18/08 |
| | | | 128/204.21 |
| 2013/0118487 A1 | 5/2013 | Huh | |
| 2013/0312744 A1 | 11/2013 | Kshirsagar et al. | |
| 2015/0096558 A1 | 4/2015 | Mazyek | |
| 2018/0326231 A1* | 11/2018 | Boomgaarden | A62B 7/08 |

* cited by examiner

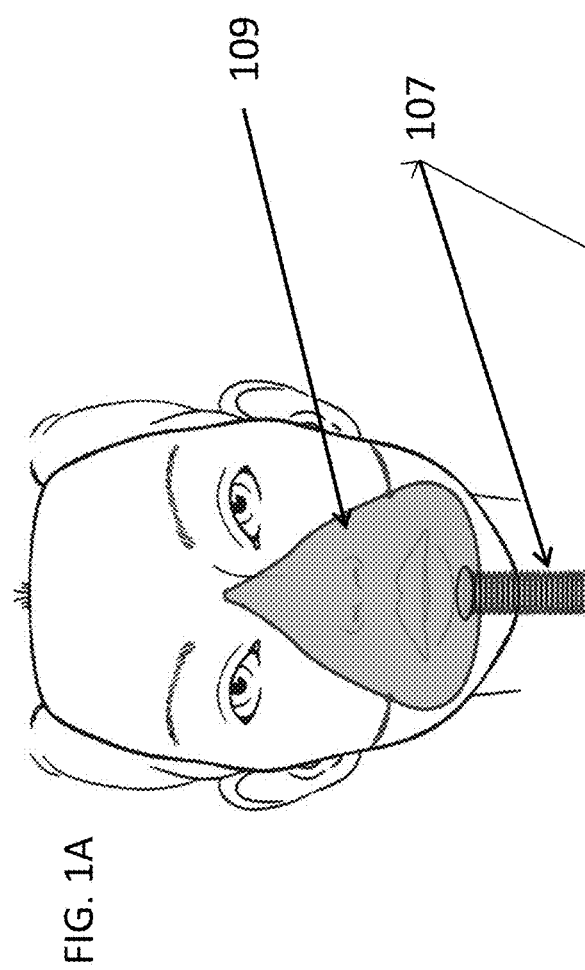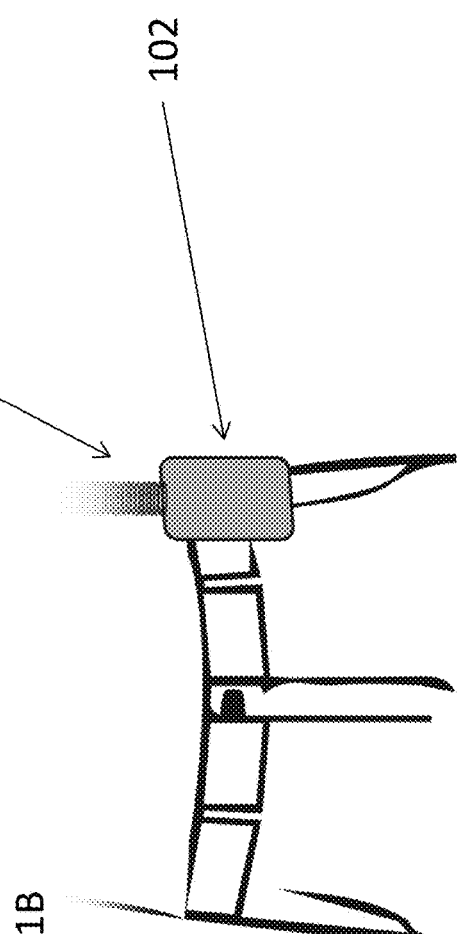
FIG. 1A
FIG. 1B

AIR PURIFIER APPARATUS WITH FLEXIBLE FILTER MODULES

FIELD OF THE INVENTION

The present invention is directed to an air purifier apparatus. More specifically, the present invention is directed to an air purifier apparatus incorporating one or more membrane filters incorporated into an airflow conduit.

BACKGROUND OF THE INVENTION

Devices for respiratory protection are readily available for medical applications. The most common devices are negative pressure respirators, which typically take the form of either a mask, or a half mask respirator. In either case, the mask covers the nose and mouth and air is drawn through the filter by the negative pressure of inhalation. These types of masks increase respiratory stress because the user must overcome the air restriction presented by the air filter. A tight fit is essential to prevent unfiltered air from entering around the mask instead of through the filter. These types of masks also interfere with normal conversation because they cover both the nose and mouth.

Also available, are Powered Air Purifying Respirators (PAPRs) which use small battery operated motor and fan assemblies to draw air through the filter and supply it at a positive pressure to the user's face mask. These units eliminate respiratory stress and are not dependent on a tight fit between the face and mask. However, they also interfere with normal conversation because they are supplied with full or half masks that cover both the nose and mouth.

The problem with both these types of respirators is that they are not cosmetically appealing and are therefore seldom worn outside an industrial workplace. For example, those devices in the prior art, are not portable or unobtrusive enough to be suitable. U.S. patent to Her-Mou (U.S. Pat. No. 5,267,557) herein incorporated by reference, is directed to providing a nose mask with a filtering device and nose clamp. The mask has been adapted to have an inlet pipe, an exhaust pipe, and the air supply driven by a dc current motor. U.S. patent to Hauff (U.S. Pat. No. 4,233,972) herein incorporated by reference, teaches providing a battery operated filter blower unit supported by the person. The mask has a filter unit and blower unit that can be adapted to different types of face masks. The filtered blower also has an ejection space for the diffusion of blown air. U.S. patent to Pokhis (U.S. Pat. No. 4,331,141); Vrabel (U.S. Pat. No. 5,009,225); Sibley (U.S. Pat. No. 5,848,592); Piesinger (U.S. Pat. No. 6,772,762), all of which are herein incorporated by reference, provides a head and upper torso covering devices wherein upon inhalation, air from the ambient surroundings are drawn in through a filter and passed to the user. Additionally, the inventions optionally provide for an electric motors to impel air into the apparatus.

However, there are many non-industrial situations in which respiratory protection would be highly beneficial. Allergy sufferers would greatly benefit from a pollen filter when outside during the allergy season as would people bothered by air pollution on high pollution days. Airline travelers would benefit from a cabin air ozone and germicidal filter, especially on long flights. Hospital workers and patients would benefit from germicidal filters. Finally, industrial workers would benefit from a less obtrusive respirator in non-toxic environments such as woodworking.

Although negative respirators are worn in everyday non-industrial environments, they seldom are because of their obtrusiveness, respiratory discomfort, and difficulty in engaging in conversation. Currently available positive pressure PAPRs are large, noisy, and typically are supplied with full face masks. It would be extremely rare to see one of these units worn outside the workplace. In summary, there are currently no acceptable devices for respiratory protection that are practical and cosmetically acceptable for use outside the industrial environment.

Figuereo, et al in U.S. Pat. No. 5,878,742, herein incorporated by reference, attempts to make a PAPR more appealing by disclosing a plenum go arrangement near the forehead of the wearer along with a baffle for distributing the air from the plenum downward over the wearer's mouth, nose, and face. However, his device is still very large and obtrusive and would not appeal to users outside the workplace.

The primary problem with current portable PAPRs is that they are powered by fans or blowers. Fans and blowers can only supply very low static air pressures. This requires that large diameter hoses and large surface area air filters be used so as to not overly constrict the airflow from the blower. Typical hose diameters between a belt mounted blower and the facemask are one inch or larger.

Another problem with current negative respirators and PAPRs is that they are designed to cover both the nose and mouth. However, covering only the nose would be perfectly acceptable in many non-toxic environments. For example, an allergy sufferer breathing filtered air through the nose would not be bothered by an occasional breath of unfiltered air through the mouth.

Yet another problem with both negative respirators and PAPRs is that they are only designed to filter the air and not to sterilize or condition it.

Accordingly, it is the object of the present invention to provide a new personal positive pressure powered respiratory protection system having cosmetically acceptable configuration and a streamlined profile.

Furthermore, it is known in the art to use cross-flow membrane filters to filter fluids. However, current use of such cross-flow membrane filters does not include their incorporation into personal air purification techniques.

Therefore, what is needed in the art is an air purification apparatus that is easily configured for different filtering situations by offering various types of membrane air filtration, sterilization, and conditioning capabilities using filter modules.

SUMMARY OF THE INVENTION

In accordance with the broad aspects of the present invention, the apparatus disclosed provides a portable air purifier capable of supplying filtered or otherwise conditioned airflow to an individual. More specifically, the present apparatus provides, in part, a modular air purification apparatus having on or more cross-flow membrane based filtering modules.

In one particular implementation, a portable air purification apparatus is provided comprising an air supply module configured to provide a stream of compressed air; a facial mask; and an air supply conduit, where the air supply conduit comprises at least one integrated filter device, the one integrated filter device having a first interface and a second interface, the first interface configured to be selectively coupled to the air supply module and the second interface is configured to be selectively coupled to the facial mask. Furthermore, the filtering modules comprises a flexible housing disposed between the first and second interfaces, the flexible housing containing one or more membrane based filtering materials configured to be positioned tangentially to the direction of flow of the air stream.

BRIEF DESCRIPTION OF THE DRAWINGS

The foregoing and other features of the present invention will be more readily apparent from the following detailed description and drawings of illustrative embodiments of the invention in which list the drawings and their captions.

FIG. 1A is an illustrative diagram of one of the components of an embodiment of the invention.

FIG. 1B is an illustrative diagram of one of the components of an embodiment of the invention.

DETAILED DESCRIPTION OF THE INVENTION

By way of overview and introduction, the present invention concerns a personal air purifier apparatus designed to filter contaminants from the ambient air and direct a continuous flow of filtered air to the user. In one particular implementation, the apparatus is further directed to a modular filter system for use in connection with the personal air purifier system. In an alternative implementation, a filter of the air purification apparatus uses a cross-flow filter membrane that is portable and discrete. Lastly, the present invention is directed to an air purification apparatus incorporating one or more sensor devices configured to evaluate the prescience of one or more contaminants within the filtered or unfiltered air.

In one or more particular implementations, the portable air purifier apparatus includes filter module interchangeability, such that new filters and functionality are provided in one or further implementations. Additionally, the apparatus makes use of one or more filtering elements using a cross flow filtering system. The cross-flow membrane system is of the described apparatus is resistant to clogs. Additionally, due to the nature of air flow through the filtering modules, the filter modules have self-cleaning properties though the rejection, rather than absorption, of contaminants. In a further implementation, the air purification apparatus also includes one or more remote pressure monitoring sensors and associated control circuitry. For example, the air purifier apparatus of the present invention includes functionality that alerts the user to when the filtering module has accumulated a pre-determined threshold of concentrated contaminants and needs to be changed.

Figure 2:
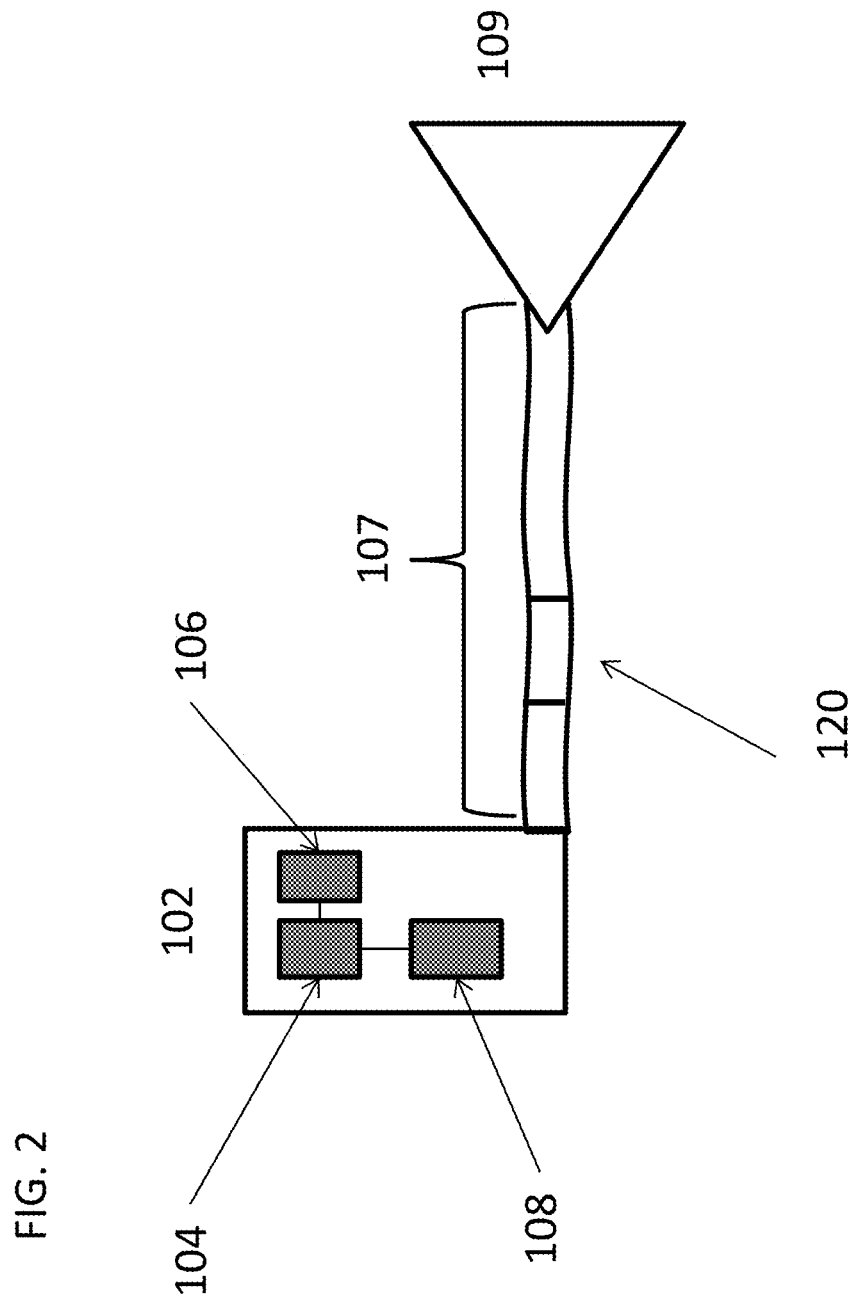
FIG. 2 is a schematic view of view of an embodiment of the invention.

With particular reference to FIGS. 1A and 1B, the apparatus described is a modular, portable, powered air purifier unit capable of supplying filtered or otherwise conditioned airflow to an individual on demand. More specifically, the air purifier apparatus of the present invention includes a mask 109, connectable to an air supply control and source device 102 via an air supply conduit 107. In a particular implementation of the apparatus, the air supply control and source device 102 is worn directly on the body of the user. For example, the air supply control and source device 102 of FIGS. 1A and B is worn by the user on a waistband or by clipping to a belt loop. In an alternative implementation, the air supply control and source device 102 is worn via a strap, holster, inserted into backpack or other harness device or article secured to the user. As shown in FIG. 2, the air supply control and source device 102 includes at least a power supply 106, an airflow generator 108 and a control device 104. For example, the power supply 106 is a battery pack, fuel cell or wireless charging device. Here, the power supply is one or more rechargeable or non-rechargeable battery cells. Alternatively, the power supply 106 is one or more wireless power devices, such as a collection of solar cells or photovoltaic materials. It should be appreciated that various combinations of power elements are combinable as the power supply 106. For instance, where a solar cell is used, a collection of rechargeable batteries are also employed to provide supplemental power.

In still a further embodiment, AC/DC, 5V, airplane or automobile converters or charger interfaces are provided so that the power supply 106 utilizes power from the electrical grid, a transport power plant or a generator. The power supply 106 provides and distributes power to the airflow generator 108 and to the control device 104.

In one particular implementation, the control device 104 is one or more processors or computers configured to directly or wirelessly connect and control the operations of one or more devices suitable to be controlled thereby. For example, and provided in more detail herein, the processor is configured with code to exchange data with one or more airflow sensors, biological or toxin detection sensors, or environmental sensors, selectable valves, control surfaces, display systems, remote computers, and integrated transmitters. Likewise, the control device 104 is configured to control the operation of the air flow generator 106. As provided in more detail herein, the control device 104 can be any computer or processor suitably configured to execute the control operations described herein.

The airflow generator 108 includes electrical, and optionally, data connections to the control device 104 and power supply 106. The air generator 108 is configured to extract ambient air from the surrounding environment via one or more air intake vents or ports (not shown) and direct extracted air to the user by way of the air supply conduit 107. In one or more implementations, the airflow generator 108 is an air compressor. Building this particular example, the air compressor of the described apparatus is designed to function utilizing the low current and voltage supplies of batteries and other direct current power sources. The air compressor may be a custom or commercial available compressor suitable for the functions so described. Furthermore, those skilled in the art would easily recognize any necessary gearing, valves, and other air movement elements necessary for a functioning air compressor so as to be fully described. The electrical connections that provide linkages to the power module are provided within the body of the housing and are configured to direct electricity to the internal mechanism of the air compressor, for example, a brushless motor. In the provided embodiment, the air compressor module is configured to use a standard fan-bladed compressor to compress air. This air is extracted through vent openings, such as located on the sides of the air supply control and source device 102. In an alternative implementation, the air compressor uses bladeless fans or air compression devices, such as impellers. In a still further embodiment of the device, the air compressor can use a bladed intake fan along with induced effects from an impeller using the Coanda effect. For example, the air compressor is configured to generate low-pressure zones around a vent and induce air flow that lacks buffeting. Therefore, in those embodiments incorporating this type of air compressor, the resulting air stream is less volatile and provides for a gentler inhalation experience. Those skilled in the art would rapidly recognize those materials and housing elements that would suitably allow for the durable construction of an air compressor, such as steel, plastics, composites and synthetic materials. In a still further embodiment of the device, the air may be supplied by a mechanical compressed tube air dispensing and or air diaphragm type of air supply."

The air supply conduit 107 is arranged to receive the compressed air generated by the air compressor. In a particular embodiment, the air supply conduit 107 is a hose or conduit of flexible constructions and is designed to allow the mask 109 and the air supply control and source device 102 to have a relatively high degree of freedom of movement relative to one another. For example, the air conduit is one or more layers of flexible plastic or synthetic material that are air impermeable or semi-impermeable.

Figure 3:
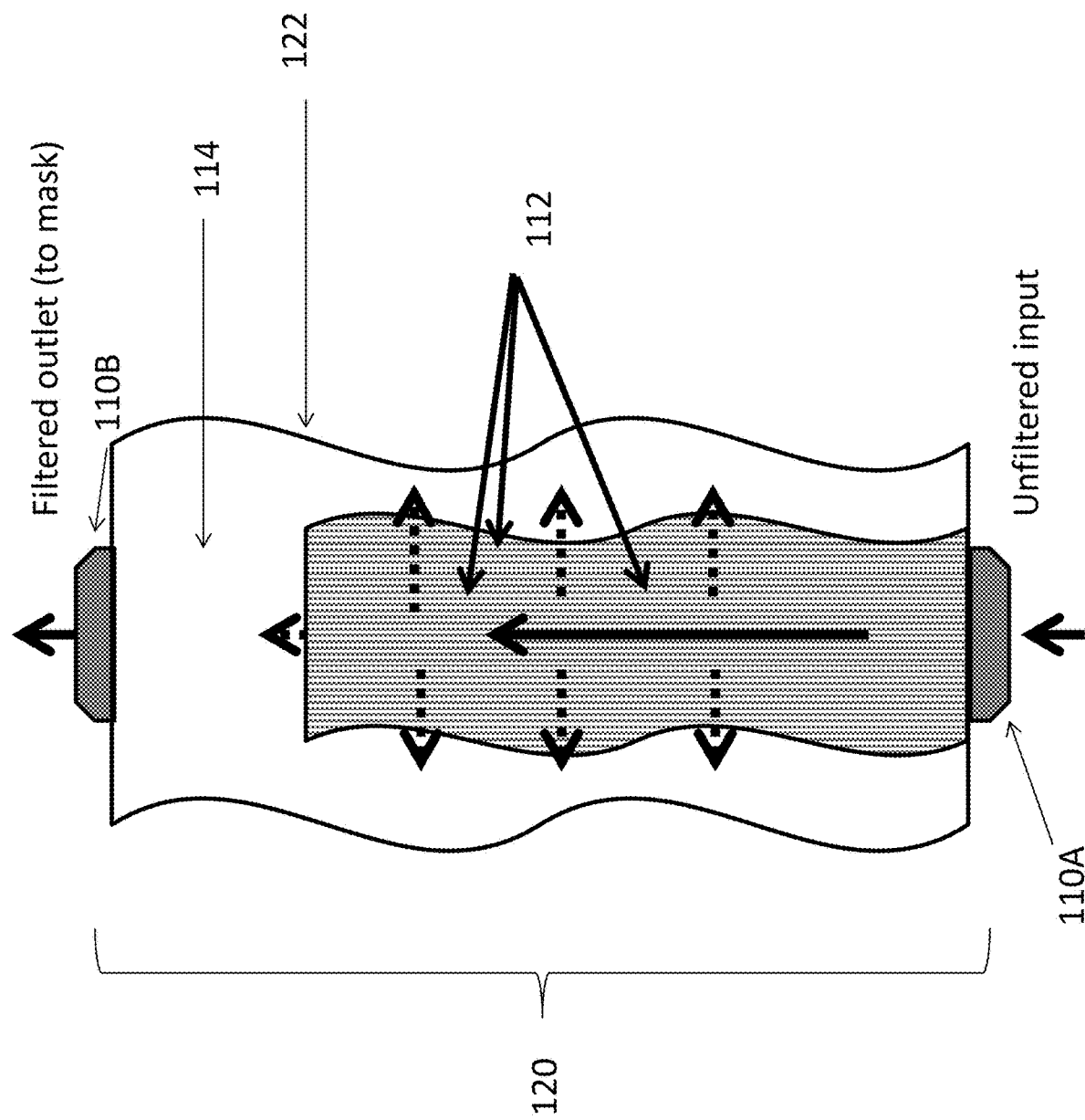
FIG. 3 is an illustrative side view of the filter component according to one embodiment of the present invention embodiments.

In one particular implementation of the present apparatus, the air supply conduit 107 incorporates one or more filtering devices 120, positioned in line with the conduit, or connectable between portions of the conduit 107 and configured to filter the ambient compressed air prior to delivering the air to the mask 109. With particular reference to FIG. 3, the air supply conduit 107 incorporates one or more crossflow filtration membranes.

For ease of discussion, but without limitation to the particular mechanisms of action described herein, crossflow filtration refers to a type of filtration processes where feed flow (such as a fluid in need of filtering) travels tangentially across the surface of the filter, rather than into the filter. One advantage of the crossflow filtering (also known as tangential flow filtration TFF) approach this is that the filter cake (e.g. the accumulated particulates on the filter) is substantially cleaned away during the filtration process, increasing the length of time that a filter unit can be operational. Another benefit relative to air purification is that the crossflow filtration in certain implementations is a continuous process. In contrast, typical air purifiers use dead-end filtration in which the feed is passed through a membrane or bed, the solids being trapped in the filter and the filtrate being released at the other end.

Generally, crossflow is used in processes for extracting small particle sized permeate from complex component feed stocks. In crossflow filtration, the feed is passed across the filter membrane (tangentially) at positive pressure relative to the permeate side. A proportion of the material which is smaller than the membrane pore size passes through the membrane as permeate or filtrate; everything else is retained on the feed side of the membrane as retentate. With crossflow filtration the tangential motion of the bulk of the fluid across the membrane causes trapped particles on the filter surface to be rubbed off. This means that a crossflow filter can operate continuously at relatively high solids loads without blinding and forms the basis of the described self-cleaning functionality.

With continued reference to FIG. 3, the air supply conduit 107 contains one or more filter modules 120. In a particular implementation, the filter modules 120 contain one or more filter elements 112. In a particular example, the filter modules 120 have a flexible exterior sheath or encasement 122 that permits a degree of flexibility.

The filter elements 112 are a collection of hollow filter fibers which form a fiber membrane. Each filter fiber 112 is formed of a porous filter material and has a central lumen running its length. In one specific implementation, the filter fiber 112 has a length of between 30 to 110 cm and lumen diameters of 0.5 to 1.75 mm. In one specific implementation, the lumen has a circular cross section. Alternatively, the cross section of the lumen is rectangular, oblong, or oval. While the provided illustration depict the fibers and roughly cylindrical in shape, it will be appreciated that the filter fibers can assume any shape so long as they possess a central lumen. The body of the filter fiber is equipped with pores to filter a fluid flow passing tangentially across the interior surface defined by the central lumen. In one particular implementation, the range of pore sizes in a given filter fiber determines the selectivity of the filter. For example, the filter fibers 112 are microfiltration filters with pore sizes of 0.1 µm and larger. In another implementation, the pore size of the filter fibers 112 are within the range of 0.1 to 1 µm, as these pore sizes are suitable for separation of cellular organisms of a certain size. In a further implementation the filter fibers use ultrafiltration pores Ultrafiltration filter fibers have pore sizes in the range 20 to 100 nm, and are generally characterized in terms of the nominal molecular weight cutoff (NMWC), which is the molecular weight of the largest globular protein that can pass through the membrane. NMWC values range from 1 to 100 kD (kiloDalton). These filters are used for concentrating and fractionating protein streams, virus concentration, desalting and buffer exchange. The objective of most ultrafiltration processes is to retain airborne macromolecules such as bacteria, spores, toxins, viruses, contaminants and impurities above a certain size, while allowing the air to pass through the filter fibers.

In one particular implementation, both ends of the filter fibers 112 are connected an air intake interface 110A incorporated into the filter module 120. The air out flow interface 110B is configured to connect one filter module to another, or to connect the filter module 120 to the mask 109. In a particular implementation, the control interface 110A includes one or more flow restriction baffles or conduits that direct all of the compressed air from the air compressor to the lumens of the filter fibers 112. However, in an alternative configuration, the filter fibers 112 are closed at one end such that only one end is connected to the air intake interface 110A.

When a fluid stream (such as compressed air) is passed with positive pressure through the lumen of the fibers, the permeate (filtered air) passes (shown as dashed arrows) through the porous material and exits into the collection area 114. It should be understood that the pressure difference caused by the air compressor drives components that are smaller than the pores through the filter. Furthermore, once passed the filter, the filtered air is directed out through an air outflow interface 110B and to the mask 109 or to a second or subsequent filter module 120. In one or more implementations, the interfaces (110A, 110B) include a check valve that opens or closes depending on if the filter element is connected to the air supply control and source device 102 and/or the mask 109 or another filter module 120. In a particular implementation, the check valves permit the removal of the filter element for inspection of contained or trapped contaminants or for refurbishment.

Figure 4:
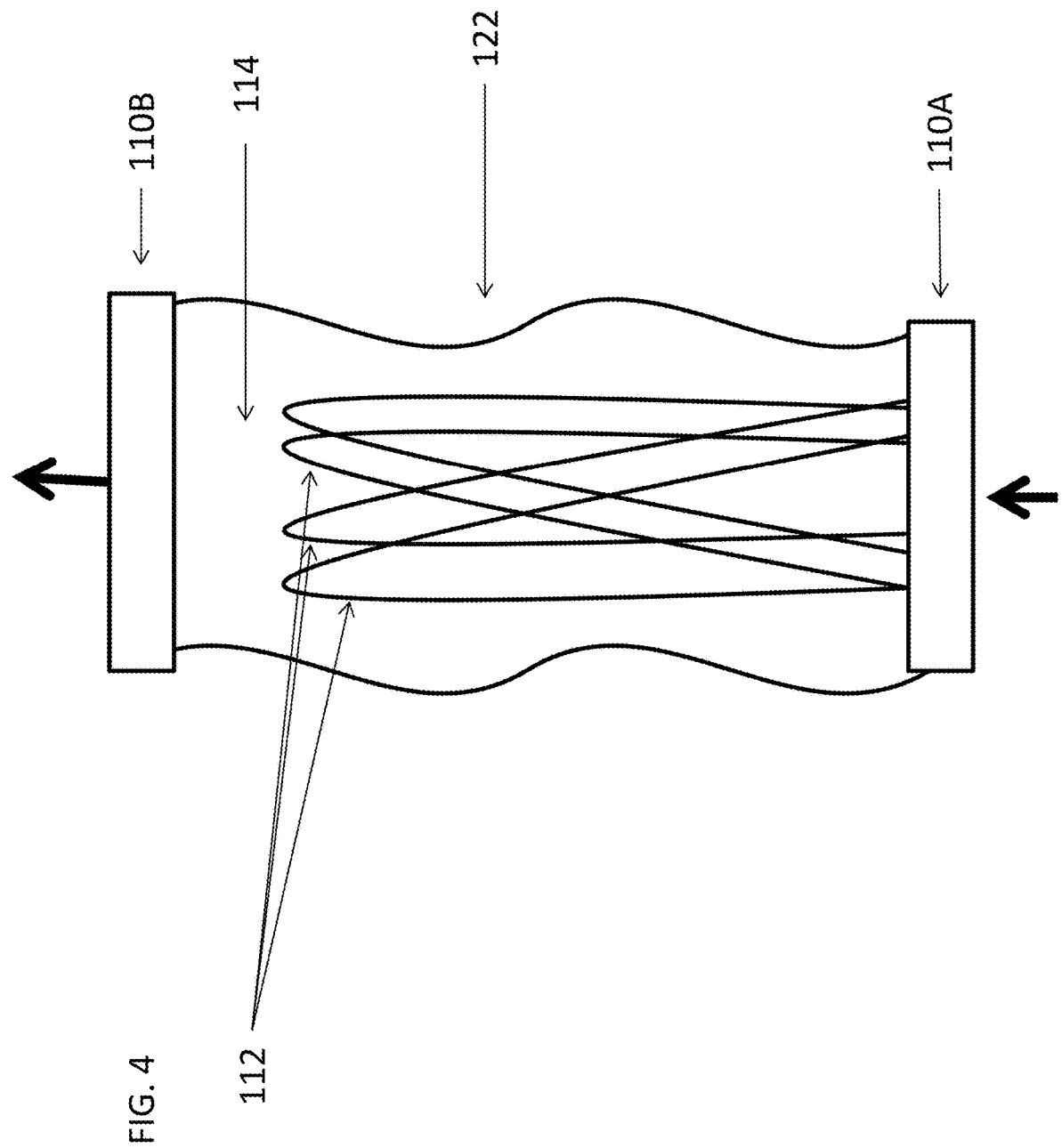
FIG. 4 is an illustrative side view of one particular embodiment of the present invention.

In an alternative implementation of the filter module 120 as shown in FIG. 4, the filter members 112 are each composed of large hollow fibers. In this arrangement, each fiber is connected at both ends to the air intake interface 110A. According to the provided implementation, the fibers are capable of moving and flexing along with the flexible material sheath 122.

Figure 5:
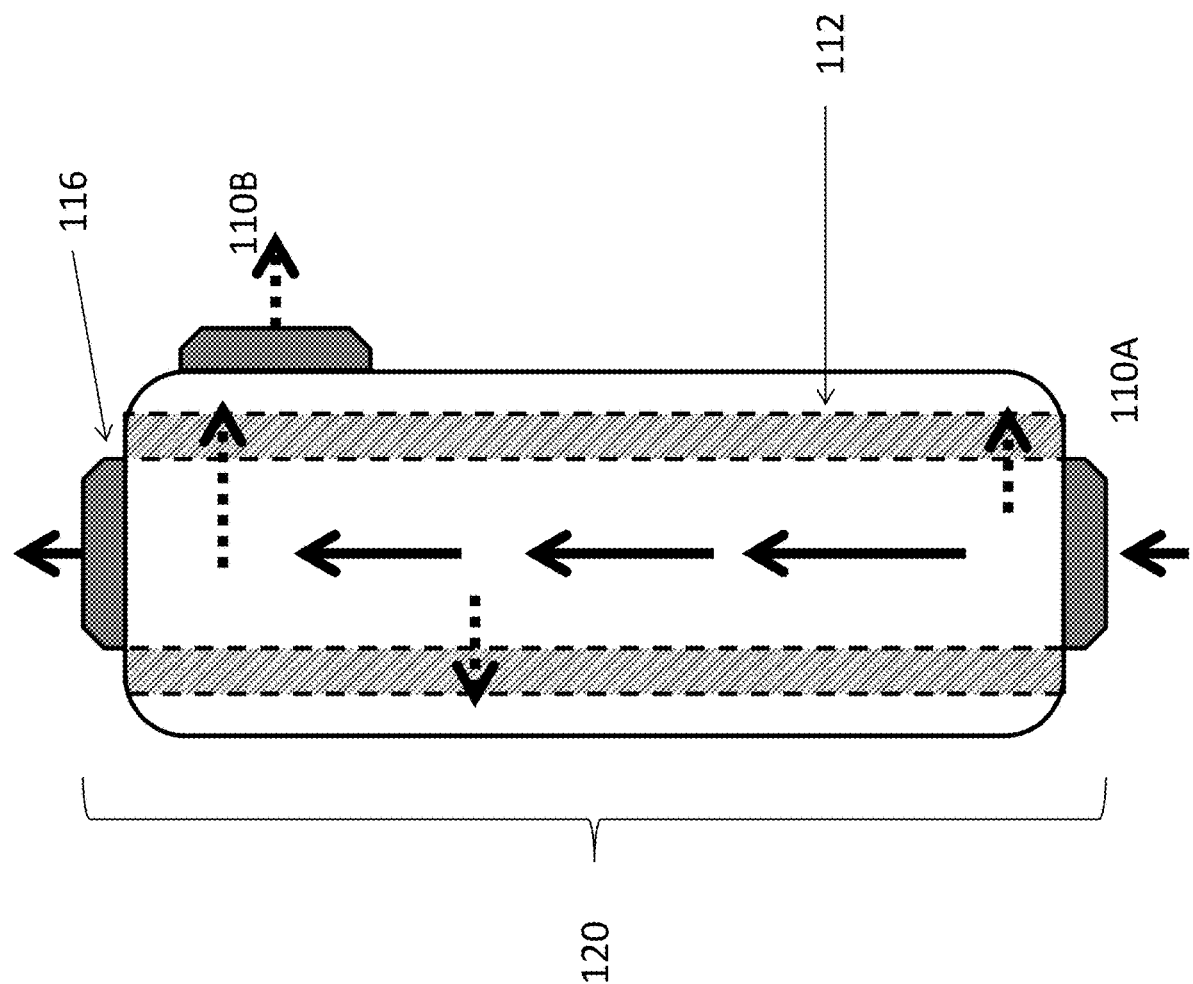
FIG. 5 is an illustrative side view of an alternative embodiment of the present invention.

In an alternative configuration, the filter module 120 shown in FIG. 5 uses a single filtering material 112 having a central lumen. A cross-section of the filtering material 112 is provided in dashed lines. Here, a continuous stream of air (solid arrow) is passed tangentially across of the interior surface of the filter element and exits through a venting port 116. In one particular implementation, the air exiting the venting port 116 is recycled and sent via a secondary conduit (not shown) back to the air compressor. Alternatively, in one or more implementations, the air exiting the venting port 116 is vented to the ambient surroundings.

In the provided configuration, particles having a size smaller than the pores of the filtering material 112 are able to pass through the filter material (shown as dashed arrows). The filtered air exits the filtering module through the outflow port 110B. In a particular arrangement, a secondary air conduit (not shown) connects the outflow ports of each filtering module 120 of FIG. 5 and provides the collected air of each filtering modules to a purified air conduit (not shown) that is coupled to the mask 109.

In one of more further implementations, each filtering module 120 is formed of flexible construction, thus allowing the series of interconnected or singular filter modules to function as a conduit between the mask and the air compressor.

While the modules herein described are an embodiment of the device as depicted in the Figures, those skilled in the art would recognize the additional modules that could be stacked on the device in question. For example, in a non-depicted embodiment, an additional UV filter is added to the filtering stage. A humidifier module can be added in addition or in alternative to the modules already provided. In both these embodiments, one or more electrical connections (such as those described in relation to the module power implementations provided herein) supply power sufficient to enable proper functioning of the modules 120.

Figure 6:
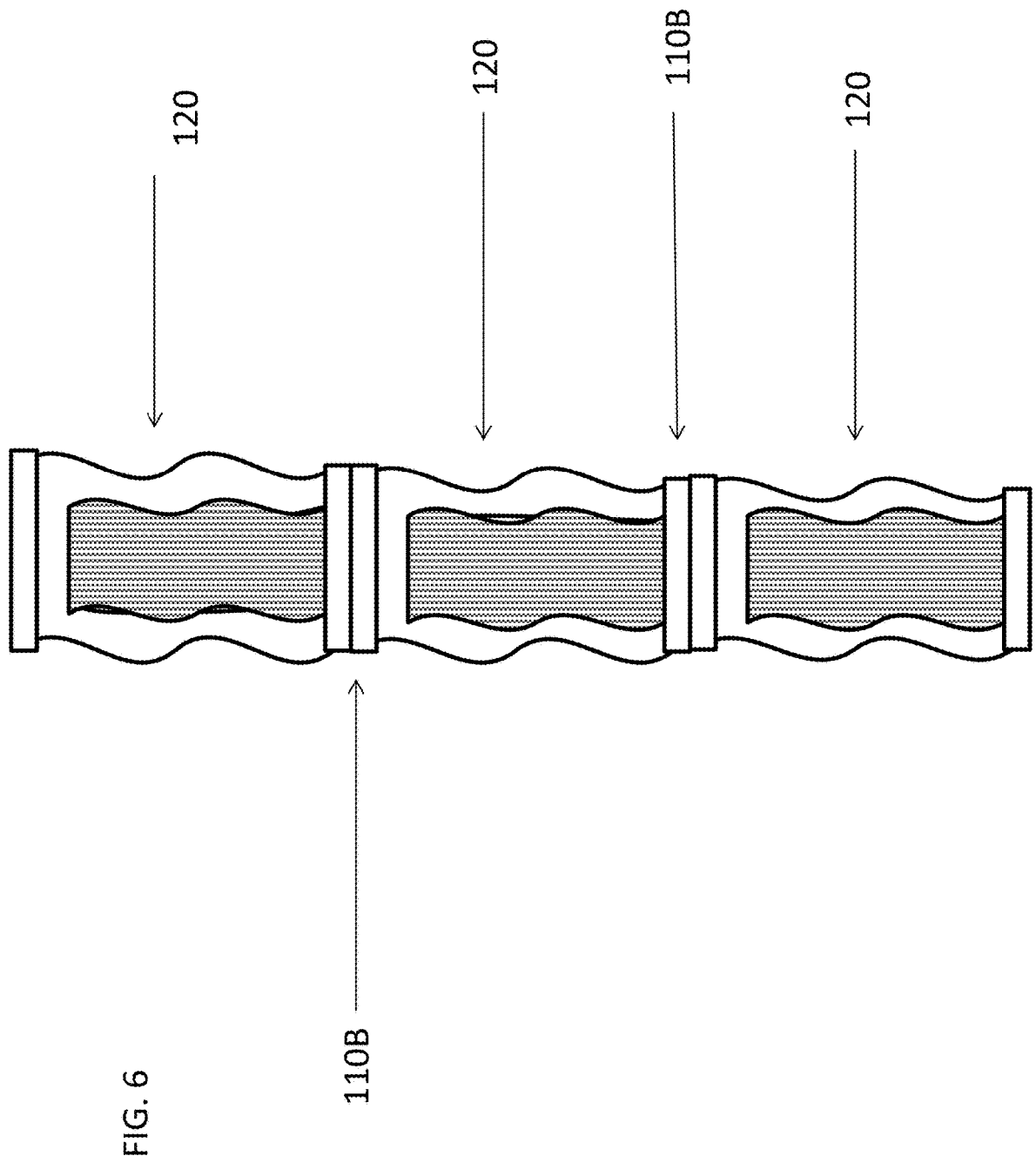
FIG. 6 is an illustrative side view of an alternative embodiment of the present invention.

With reference to FIG. 6, in one or more implementations the filter modules 120 are communicatively coupled to one another such that the entire length of the air supply conduit 107 conduit is comprised of filter modules 120. Here, each filter module is equipped with a flexible outer surface encasing one or more filter elements 112. Such configuration permits the air supply conduit 107 to function both as the filtering device as well as the conduit device that delivers filtered air to the mask 109. In one or more implementations, the filtering modules 120 include different filter materials. For example, the total length of the air supply conduit 107 can be comprised filter modules 120, each having progressively smaller pore sizes. Alternatively, in one or more implementations, each filter module 120 comprising the air supply conduit 107 is utilized to filter a particular particulate or atmospheric agent. Here, one or more air borne pathogens, toxins, agents or particulates are filtered by a specific filter, such that an additive effect of such filtering is provided.

In a further arrangement one or more of the filter modules incorporate sensors or other devices to permit the measurement of integral conditions, such as internal pressure, number and nature of airborne contaminants. In one or more implementations, the filter modules are configurable with one or more electrical or electronic components as provided herein.

Figure 7:
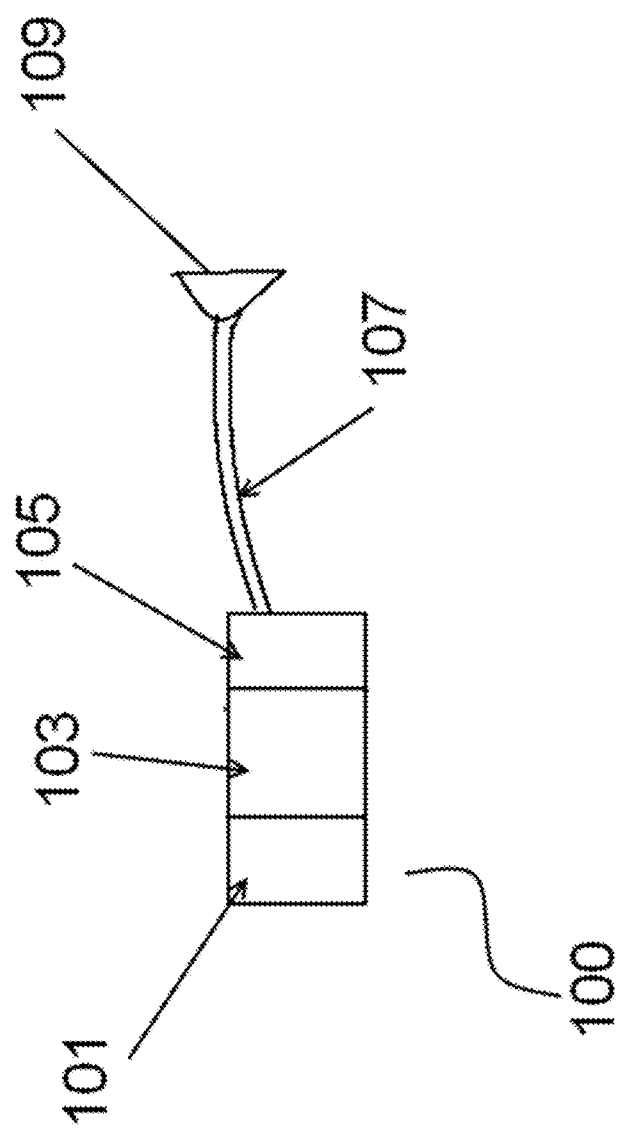
FIG. 7 is an illustrative side diagram of the components of an embodiment of the invention.

Turning to an alternative embodiment of an air purifier device, FIG. 7, provides a modular air purifier 100. The air purifier apparatus is configured to have a series of discrete physical modules that are configured to fit to one another (101-105) so as to provide all the necessary functions of a portable air purifier. In one embodiment of the device, a power pack 101 is secured to an air compressor 103. The power pack is configured as a housing having a body of roughly cylindrical or oblong dimensions. Within this housing, an electrical energy generation means is secured, for example a battery pack. Furthermore, the power module is configured so that all necessary electrical connections are made between the compressor module 103 and the power module 101 without the need additional tools or hardware. In an embodiment of the apparatus shown, the power module 101 is provided with a series of batteries (not shown). The provided batteries are rechargeable and removable from the power module 101. In another configuration, the power module itself is rechargeable by connecting it to a power source, such as an electrical outlet, charging cable, or charging dock. In one or more implementations, the charging dock uses wireless charging elements incorporated into the power module 101 and a base station to charge the all or a portion of the power module 101.

Additionally, in an alternative embodied, the power module 101 can supply direct current from a residential outlet or commercial source by employing an AC/DC converter. In an alternative embodiment, the present invention power module uses a fuel cell or other form of electrical energy generation. Additionally, in still a further embodiment, a photovoltaic cell is affixed to the body and provides either supplemental, or compete electrical power to the device. In still a further embodiment, an airplane or automobile charger can supply direct electrical power to the power module 101

The power module 101 is fitted via electrical and physical connectors to an air compression module 103. The air compression module 103 is configured to extract ambient air from the surrounding environment via vents and direct it to the user via a hose or tubing 107 to a nasal cover 109. The air compressor 103 is configured as being located within a housing of similar dimensions to that of the power pack. Those skilled in the art would readily appreciate that the dimensions described herein are in no way limited.

The present device is configured as an air compressor that is designed to function utilizing the low current and voltage supplies of batteries and other direct current power sources. The air compressor may be a custom or commercial available compressor suitable for the functions so described. Furthermore, those skilled in the art would easily recognize any necessary gearing, valves, and other air movement elements necessary for a functioning air compressor so as to be fully described. The electrical connections that provide linkages to the power module are provided within the body of the housing and are configured to direct electricity to the internal mechanism of the air compressor, for example, a brushless motor. In the provided embodiment, the air compressor module is configured to use a standard fan-bladed compressor to compress air. This air is extracted through vent openings located on the sides of the air compressor housing 103. Once air has been compressed, it is directed to the front of the device, through another vent or grate.

An alternative embodiment provides that present device employs the use of blade-less fans or air compression devices, such as impellers. In a still further embodiment of the device, the air compressor can use a bladed intake fan along with induced effects from an impeller using the Coanda effect. For example, by the generation of low pressure zones around a vent and hence inducing air flow that lacks buffeting. Therefore, in those embodiments incorporating this type of air compressor, the resulting air stream is less volatile and provides for a gentler inhalation experience.

As stated previously, the body of the air compressor module can be made in similar dimensions and materials as the power unit 101. However, in the present embodiment the overall length of the air compressor module is larger than that of the power module 103. Those skilled in the art would rapidly recognize those materials and housing elements that would suitably allow for the durable construction of an air compressor, such as steel, plastics, composites and synthetic materials.

In an alternative implementation, as in the embodiment of the device depicted in FIG. 7, once the air has been compressed by in the air compression module 103, the compressed air is directed to a filtering unit 105. The filtering unit 105 is configured as a modular housing having the same size and shape as the previous modules. The body of the housing has a vent that accepts the compressed air from the air compression unit 103 and passes it through a series of removable or non-removable filters. These filters can be of any type and made suitable to restrain particulate matter in the air stream. For example, the filters can remove, dust, pollen and other allergens or particulates from the air prior to inhalation by the user. In one implementation, the filtering units use cross-flow filtering as provided in FIGS. 3-5. Additionally, it is possible to use electrostatic filters to remove particles, such as smoke, from the air stream. Additionally, filters with anti-bacterial, anti-microbial or anti-viral properties can be included. In an additional embodiment, the filters of the present device also include a series of filters that can be stacked so as to achieve combination of filtering mechanisms. In accordance with the outlines of the invention, it is possible to effectuate air filtering using a series of filters. For example particulate filtering provided using HEPA (high efficiency particulate air) filters. Odor and ozone filtering will be provided using activated carbon, cpz (carbon, permanganate, and zeolite), or the like. Organic and chemical vapor filtering could be provided using readily available filters custom packaged for this system. Air sterilization will be provided using an ultraviolet germicidal lamp. Air conditioning will be provided using a distilled water moisturizing module for humidifying, a solid state thermoelectric cooler module for cooling, and a resistive element for heating. Upon filtering of the air stream, the filter module 105 directs the filtered air to a progressively narrowing cap 107 that increases the air pressure and drives the compressed air through a flexible tube 107 or conduit.

Figure 10:
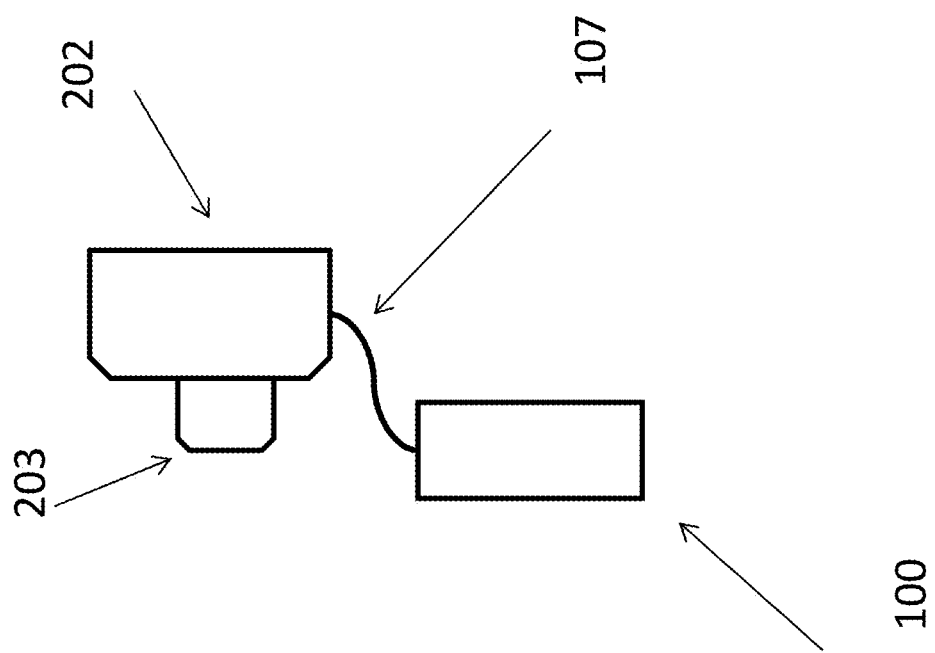
FIG. 10 is an illustrative side view of one of the embodiments.

The filtered air, directed through the tube 107 is then transported to the nasal mask 109. The nasal mask 109 is configured and adapted to cover the nose of the user, but does not interfere with the mouth or eyes of the user. The nasal mask 109 is configured with an inlet that allows the tube to direct filtered and compressed air to the nose. In a particular embodiment, the nasal mask 109 is secured to the face of the user with a strap or string that wraps around the back of the skull and is secured with a clasp or tab. In an alternative embodiment, the proposed device uses negative pressure to secure the nasal mask to the face without the need of straps. In this implementation, the nasal mask 109, or the nose and face mask 202 of FIG. 1 or 10 contains on its surface, vents 301 capable of opening outwards only. As such, upon user exhalation, the vents open and expel the user's breath. Alternatively, when the user inhales, the vents are closed, thereby producing negative pressure that accelerates the filtered air into the user's lungs, as well as forming an airtight seal with the nasal mask.

In a further embodiment of the present invention, the air purifier device includes a mask 109 or 202 configured to cover the nose and the mouth of the user. In one or more embodiments, the mask 202 is equipped with a gasket or other material suitable for forming an air-tight seal with the face of a user. In a further embodiment, the mask is equipped with a material hood configured to be passed over the user's head and encase the users head, with the exception of the user's eyes nose and mount in a anti-bacterial or contaminant resistant covering. For example, a balaclava style covering, designed to expose only a portion of the user's face, is integrated with the mask.

In another embodiment, the mask 202 is equipped with a device or mechanism for securing the mask to the user's face. For example, a strap or band is affixed to the mask 202 and fits around the user's head. In yet an alternative arrangement, the mask 202 is fixed to the user's face through surface tension or suction. For example, the mask 202 is configured with a plurality of suction devices around the perimeter of the mask that affix to the face of the user and are designed to secure the mask to the user's face. In a further arrangement, the interior surface of the mask is coated or formed of an antimicrobial or anti-biological agent.

The mask 202, in one embodiment, is equipped with one or more sensors connectable to one more local or remote computer processors configured to sample or analyze ambient air and make an assessment of contaminants or infectious agents present in the ambient air. In one or more arrangements, the analysis and determination of specific agents within the ambient air triggers an alert to the wearer of the mask 202. For example, upon determining a high concentration of pollutants, a processor integral (with associated elements such as memory, input/output, and power) or remote to the mask sends an audio alert to a wearer informing them of the particulate level. Where the processor is integral to the mask, in one arrangement the processor is configured to communicate with a wireless communication device (such as a smartphone) and provide an application executing on the wireless communication device with the data gathered by the sensors of the mask. In another arrangement, the mask is configured to communicate with a database or data storage device or appliance to record and update a central repository with information about the ambient air quality.

A GPS unit, in one arrangement, is also incorporated or integral to the mask and communicates with one or more processors to provide location data and to transmit location data to a user display or to a remote database.

In a further embodiment, the sensors are integral to the filter modules and are designed to communicate via RF frequencies with one or more processors.

In a particular embodiment, the user mask 202 is equipped with one or more outlet valves configured to expel inhaled air back to the surroundings. In a particular embodiment, the outlet valves are operable by positive or negative pressure valves, such as spring or diaphragm actuated devices such that upon exhalation the valves open and allow air back into the environment. In another arrangement one or more sensors are connected to an electronically activated valve and cause the valve to open in response to measured biometric conditions, such as chest movement or detected exhalation.

In one or more embodiments, the air purifier device described is configured to generate a positive pressure within the mask so as to prevent the infiltration of biological, chemical or radiological elements into the interior space of the mask.

Figure 9:
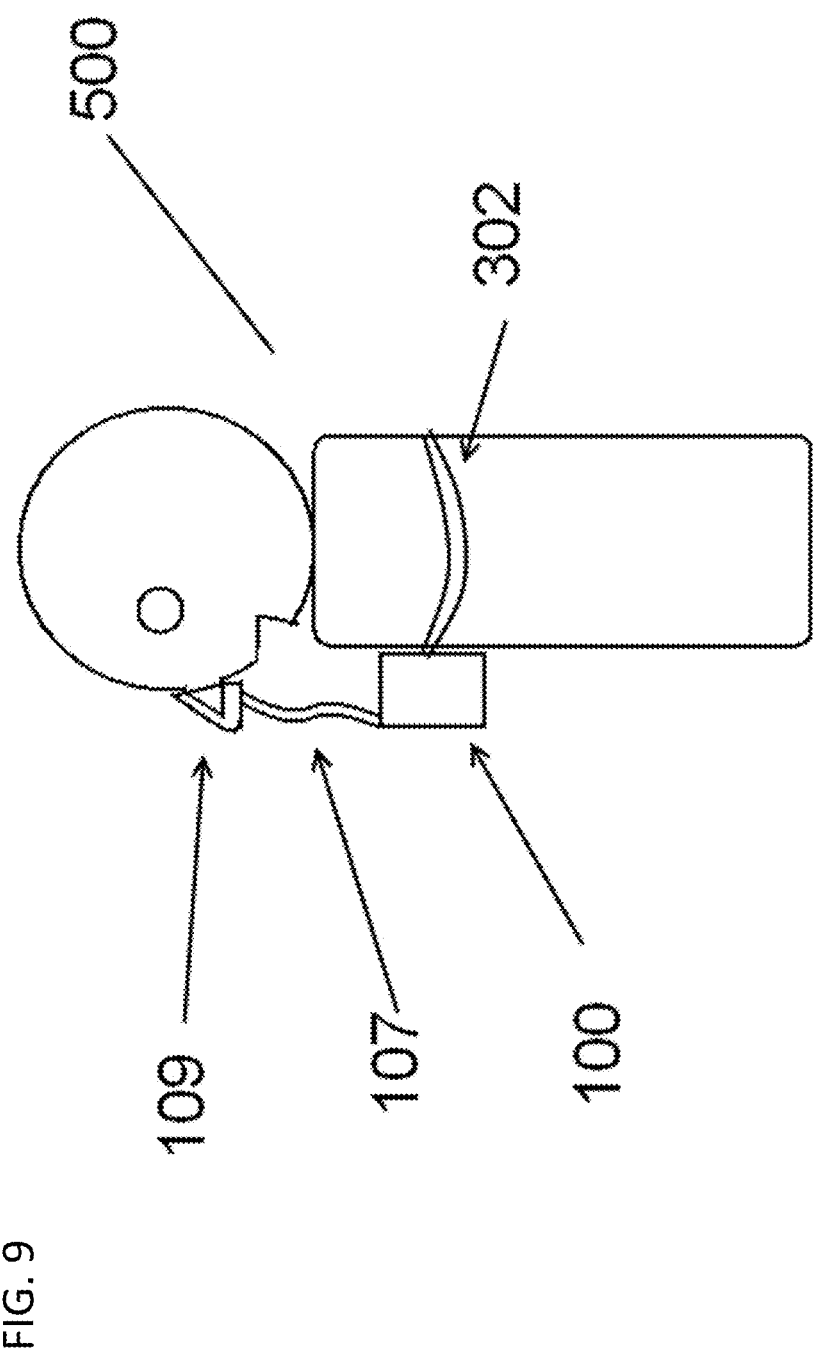
FIG. 9 is an illustrative side view of one of the embodiments.

The outlet valve in one or more configurations directs the expelled air to filtering attachment 203. In a particular configuration, the filtering attachment is directly affixed to the user mask 202 as shown in FIG. 9. The filtering attachment includes one or more filtering elements (not shown). One filtering element is a HEPA filter designed to filter out microorganisms from the air expelled by the user. In a further arrangement, the filtering elements are connectable or stackable such that air that passes through a first filter is then passed though a second, and subsequent filters. In one arrangement, a filtering element is a UV filter element, or other radiation delivering filter that is designed to deliver radiation to the air that has been expelled by the user.

In a particular arrangement, the air filter element includes an electro-static, humidifier, dehumidifier, or other filtering technology to process air that has been expelled by the user. For example, one or more filter elements are negative ion generators, such as those described in pending Chinese Patent Application Nos. CN201510320872, and CN201510320874 herein incorporated by reference in its entirety.

Furthermore, prior to exiting to the ambient air, the expelled air (including air that has been filtered) is analyses by one or more sensors arranged to analyze the air expelled.

The outlet vent is, in one arrangement, connected to the expelled air filters via a conduit or hose. In this configuration the wearer can pipe or direct the expelled air to a series of filters that are affixed to the wearer or are otherwise remote to the wearer.

The mask 209 or 109 can include or incorporate a pair of detachable goggles that are configured to fit over the eyes of the user. In one or more arrangements, the goggles are contoured so as to form a tight seal with the mask 209 or 109 but not exchange air between the volume enclosed by the goggles and the volume of air enclosed by the mask. In yet a further arrangement, the goggles include one or more visual display elements, such as a heads-up display, transparent display, monocle, or other display device that is configured to provide visual information to the user. In one particular configuration, the display is configured to provide visual indications as to the ambient air quality or presence of specific or general contamination levels. For example, the goggles are equipped with one or more processors configured to receive data from the processor integral to the mask 202, or from the sensors integral to the mask.

Furthermore, the sensors referenced throughout are configured to analyze the expelled air are further configured to provide information to the processor(s), such as the processor of the goggles, and indicate the presence of contaminates within the expelled air of the user. In this configuration, the sensors are configured to evaluate the presence of chemicals, microorganisms, compounds or other indicators of the health of the wearer. In one or more non-limiting embodiments, the sensors integral to the mask can include one or more of the following properties, procedures, requisite hardware and software necessary to effectuate: Gas chromatography-mass spectrometry; GC-MS Proton transfer reaction mass spectrometry PTR-MS and PTR-TOF; selected ion flow tube mass spectrometry SIFT-MS; Ion mobility spectrometry (IMS); Fourier transform infrared spectroscopy FTIR; Laser spectrometry Spectroscopy; Chemical sensors or Electronic noses. The described sensor may implement one or more of the following: metal-oxide-semiconductor (MOSFET) devices—e.g. a transistor used for amplifying or switching electronic signals. In this arrangement, each additional measured particulate will directly affect the transistor in a unique way, producing a change in the MOSFET signal that can then be interpreted by pattern recognition computer systems, such as ones integrated into the mask of the preset device and determine the particular presence of one or more contaminants. Sensors in alternative embodiments further include organic polymers that conduct electricity; polymer composites or a further combination of non-conducting polymers with the addition of conducting material such as carbon black; quartz crystal microbalance sensor utilizing the change in frequency of a quartz crystal resonator to sense the presence of compounds within the air and/or surface acoustic wave (SAW) devices that utilize the modulation of surface acoustic waves to sense a physical phenomenon, such as the presence of various compounds.

In a particular embodiment, each of the modules connected to the common power interface generate a signal or signature receivable by processor 104. In one or more arrangements, the processor 104 is also connected to the common power interface and is integral to the air purifier device. Here, each module connected to the common power interface broadcasts a signature (such as through a DC based powerline communication, Wifi, Bluetooth, or near field RF communication) that is received by the processor 104. The signals generated by each module include at least a standardized functionality (e.g. filter, humidifier). Additional information can be sent detailing the make, model number, specific purpose, or other elements of interest regarding the module. In a further arrangement, the processor 104 stores the module signature data in one or more local or remote storage locations.

In a particular embodiment, the processor 104 is configured to evaluate through the one or more connectable sensors and filter modules if the present ambient environment is toxic or contaminated. When toxins are detected, the processor 104 is configured by one or more software modules to use the signature of each filter to determine if one or more filters are sufficient to purify the ambient air. By way of non-limiting example, where one or more sensors detects a hazard (e.g. airborne toxin), the processor 104 evaluates the toxin against a stored or accessible list (stored locally or accessible on or through a network) of agents that can be filtered by the one or more filter or conditioning modules. Where the present filters are unsuited to filtering the specific toxin, an alert or alarm is raised indicating that the level of protection is inadequate.

Figure 8:
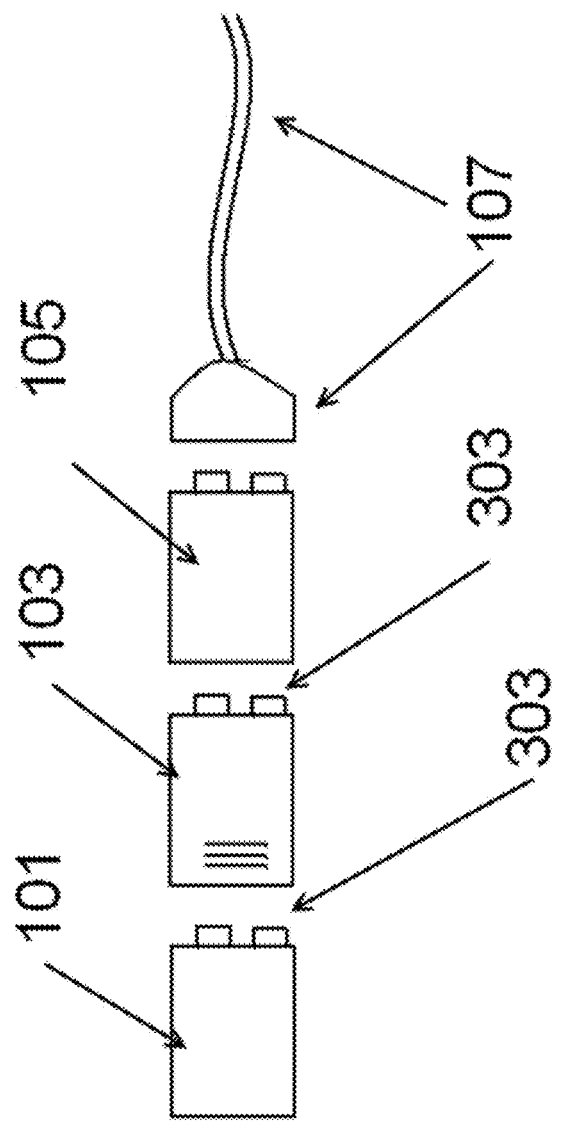
FIG. 8 is an exploded view of an embodiment of the invention.

As described above, the modules of the present device are configured to fit together with one another. Specifically, each module can be combined with other modules so that the electrical and air flow connections can be passed from one module to the next depending on the arrangement of the modules. As depicted in FIG. 8, the power module 101 connects to the air purifier 103 module by connection sockets or plugs 303. The connection sockets 303 are equipped with electrical connectors configured to mate with sockets (not shown) located on one end of the air purifier 103. These sockets provide both electrical connections, but also physically connect the modules into a single piece. Additionally, electricity as well as compressed air can be passed to the next module through similarly designed connection sockets 303. In the depicted device the filtering module is connected. In the event that a filtering module is not necessary, the compression cone and hose 107 is fitted to the top most module and is designed to ground the electrical connection and direct the compressed air. In those embodiments where the one or more filtering modules are present, the compression cone and hose 107 is simply secured to the output of the last filter.

As depicted in FIG. 9, the device described can be secured to the user 500 by means of a harness or belt 302. The belt or harness can be used to secure both the device when in operation, and also function as a storage unit for when the device is not in use, but is being carried. Additionally, the belt has portions or pouches for the storage of additional filter modules, additional power modules or other elements not herein described.

While the modules herein described are an embodiment of the device as depicted in the Figures, those skilled in the art would recognize the additional modules that could be stacked on the device in question. For example, in a non-depicted embodiment, an additional UV filter is added to the filtering stage. A humidifier module can be added in addition or in alternative to the modules already provided. In both these embodiments, the power module provides sufficient electrical power to provide proper functioning of the modules.

In the alternative arrangement of elements, the portable air purification apparatus is equipped with a second air compression module, wherein the second air compression module provides accelerated and pressurized air stream to the first air compression module.

In an additional alternative arrangement of elements the portable air purification apparatus is also equipped with an oral cavity mask configured to connect to the filtering module, this could be a separate filtering device from those envisioned as part of the apparatus. In this arrangement the oral cavity mask is configured to connect to an exhaust outlet. In an alternative arrangement, the power module is a battery pack, alternating current power supply or direct current power supply. The power supply can be computer controlled so as to be on a timer, or respond to environmental conditions and factors.

The filter module can be selectively engageable, that is the filtering functions themselves can be selectively engaged by a user manually, or via a pre-programmed routine stored within the memory of a computer. For example, ionizing radiation inserts integral to a filter module are selectively engaged for specific events or situations. Other inserts for the filter modules are envisioned.

Figure 11:
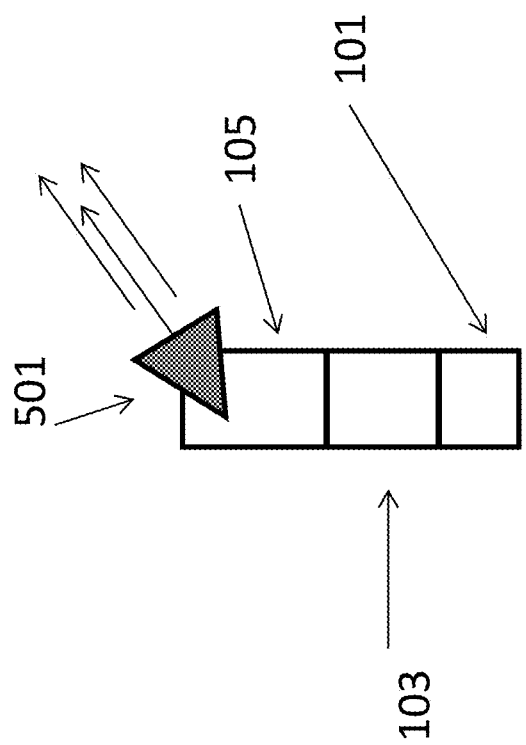
FIG. 11 is an illustrative side view of one of the embodiments of the present invention.

In a further embodiment, the air purifier described eliminates the need of a mask and instead direct air to the face of the user. In this arrangement, as provided in FIG. 11, the purifier filters ambient air using the power module, the compressor and at least one filtering module. The air is sent to an accelerator 501 to accelerate the air to the face of the user. The accelerator can be a fan or other device configured to compress and send the filtered air to the user. Alternatively, the accelerator can use laminar flow, such as though the use of, planes, foils or other structures to generate an air curtain between the air purifier and the user to prevent the intrusion of contaminates into the user's air stream. In one or more embodiments, the mask-less configuration is secured to a user through a strap, lanyard, harness or other device that allows the accelerator to be positioned so as to direct the purified air stream to the face of the user. For example, the angle and orientation of the accelerator 501 is changeable based on the user's anatomy and physical characteristics.

In a further embodiment of the air purification apparatus described, an oxygen generation module is provided. The air or oxygenation module provides a source of clean air or oxygen to the user independent of filters or other mechanisms used to purify air. For example, in instances where the ambient air can not be filtered, or the filters currently equipped with the air filter apparatus are not sufficient to purify the air to an acceptable level, the oxygenation module provides a source of purified air for use by the wearer. In one configuration, the oxygenation module is a container of pressurized oxygen or air that is equipped with one or more control valves that selectively permit or restrict the flow of air to the air compressor module.

For example, in an arrangement where one or more sensors detects the presence of an airborne toxin that the engaged filters are incapable of filtering, the processor 104 causes the one or more control valves to operate and provide stored oxygen to the user. In this arrangement, the air compression module is also configured with a selectively engageable inlet. Thus, the mask becomes an environment where air or oxygen is provided from only a stored source and the exhaled air is permitted to exit the mask due to positive pressure.

In one particular arrangement, the air or oxygen is supplied via a pressurized air or oxygen canister. The oxygen canister is, in one configuration, a standard sized oxygen tank equipped with one or more hoses or conduits to connect or transfer air or oxygen to the air compressor module 103. In this arrangement, a tank interface module (not shown) is connectable to the air compressor so as to supply contaminate free air to the user.

In an alternative arrangement, an oxygen repository module is connectable to the air purifier apparatus. In one non-limiting arrangement the oxygen repository module contains an amount of an oxygen sequestration compound. For example, in one arrangement the oxygen sequestration compound is 2-aminoterephthalato-linked deoxy system, [{(bpbp)Co2II(NO3)}2(NH2bdc)](NO3)2.2H2O (bpbp-=2,6-bis(N,N-bis(2-pyridylmethyl)aminomethyl)-4-tert-butylphenolato, NH2bcd2-=2-amino-1,4-benzenedicarboxylato or a nitrate salt thereof as provided in Sundberg, Jonas; Cameron, Lisa J.; Southon, Peter D.; Kepert, Cameron J.; McKenzie, Christine J. (2014). "Oxygen chemisorption/desorption in a reversible single-crystal-to-single-crystal transformation" Chem. Sci., 2014, 5, 4017-4025; herein incorporated by reference in its entirety. In an alternative arrangement the sequastation compound is Tetramethylammonium ozonide ((CH3)4NO3). In a particular configuration, one or more oxygen releasing devices are configured to induce the oxygen sequestration compound to release oxygen. For instance, the air purifier device includes one or more addressable or controllable heating elements are configured to heat the oxygen sequestration compound until oxygen is released from the compound. In a particular configuration, the oxygen sequestration is connectable to the common power and air interface. Here, the processor 104 mediates the functioning of the heating elements to maintain a steady stream of generated uncontaminated oxygen. For example, the oxygen repository module also includes temperature sensors, backup power supplies, oxygen sensors, and one or more integrated control processors configured to communicate with the processor 105.

In another arrangement, the oxygen repository module includes a selectable charging port that permits ambient air to come in contact with the oxygen sequestration compound when the compound has been depleted of oxygen. In this arrangement, the oxygen repository module is configured to both store and release oxygen into the air compressor for further use by the air purifier device.

In one arrangement, the oxygen sequestration module includes between 0.1 and 10 liters of sequestration compound.

In a further arrangement, the oxygen repository module utilizes a pressure swing absorption device, chemical oxygen generators, oxygen candles or the components of self-contained self-rescue devices, such as those using potassium superoxide.

In one or more arrangements, the air purifier is a portable devices or collection of devices designed to provide clean, filtered or otherwise processed air to users requiring protection from air pollution, including chemical, radioactive, airborne bacteria, molds, fungus, and virus particulates and particles. Those possessing an ordinary level of skill in the art will appreciate the strategic product benefits of the present device, including its automatic safety features, ease of use, and low-cost. The present invention further utilizing new technologies including nano-manufacturing (such as nanoscale filters, controls, material and or devices) that allow the described device and systems to miniaturize the micro computer, mini air pumps, required sensors and devices that will be made consumer friendly and useful in possible joint ventures with third party manufactures, providers and companies.

It should be understood that various combination, alternatives, and modifications of the present invention could be devised by those skilled in the art. The present invention is intended to embrace all such alternatives, modifications and variances that fall within the scope of the subject matter described herein.

In a non-limiting example, the processor, 104 and any remote computer communicatively coupled to the processor are commercially available or custom built computers equipped with a one or more processors, graphical processing units, field programmable gate arrays, RAM and ROM memory, network interface adaptors and one or more input or output devices. In a further embodiment, the processor 130 or computer 00 is computer server or collection of computer servers, each server configured to store, access, process, distribute or transmit data between one another and other computers or devices accessible or connectable therewith. In still a further embodiment, processor 130 or 100 is a hosted server, virtual machine, or other collection of software modules or programs that are interrelated and hosted in a remote accessible storage device (e.g. cloud storage and hosting implementation) that allows for dynamically allocated additional processors, hardware or other resources on an "as-need" or elastic need basis. In a further embodiment, the processor is configured to implement elastic load balancing algorithms to harness remote computing capacity or functionality to enable the system to handle computationally or otherwise resource intensive actions and procedures.

In a particular arrangement, the processor or computers referenced herein are desktop or workstation computers using commercially available operating system, e.g. Windows®, OSX®, UNIX or Linux based implementation. In a further configuration, the processor or computer is a portable computing device such as an Apple IPad/IPhone® or Android® device or other commercially available mobile electronic device configured to have access to or implement remote hardware as necessary to carry out the functions described. In other embodiments, the processor or computer includes custom or non-standard hardware configurations. For instance, the processor or is a one or more micro-computer(s) operating alone or in concert within a collection of such devices, network(s), or array of other micro-computing elements, computer-on-chip(s), prototyping devices, "hobby" computing elements, home entertainment consoles and/or other hardware.

Typical types of air filtration that will be provided are particulate, odor, ozone, and selected organic and chemical vapors. Sterilization will be provided using ultra-violet germicidal lamps. Typical air conditioning provided will be heating, cooling, or moisturizing the filtered air.

Particular alternative implementations:

Point 1. A portable air purification apparatus comprising:
a power module;
a first air compression module;
at least one selectable activation state filtering module, wherein the activation state of the filtering module is in response to a signal received by one or more processors; wherein the modules are configured to connect to with one another so that the power module distributes electrical energy to the air compression module and the air compression module distributes compressed air to the filtering module;
a nasal mask configured to connect to the filtering module and direct compressed air into the nasal passages of a user,
a plurality of air quality sensors configured to communicate with the one or more processors, the one or more processors configured to execute code residing therein; wherein upon detecting one of a pre-determined plurality of air contaminants, the sensors are configured to send a signal to the processor; wherein upon receipt of a signal by the processor, the processor is configured to change activate the selectable filtering module.

2. The portable air purification apparatus of point 1, wherein the processor is a remote computing device.

3. The portable air purification apparatus of point 2, wherein the processor is configured to communicate with the plurality of sensors using RF frequencies.

4. The portable air purification apparatus of point 1, wherein the processor is further configured to alert the user to the air quality conditions sensed.

5. The portable air purification apparatus of point 4, further comprising a display device, wherein the processor is configured to provide a visual indicator to the display device to indicate the air quality condition determined.

6. The portable air purification apparatus of point 5, further comprising a display device, wherein the display device is a head-mounted display.

7. The portable air purification apparatus of point 6, wherein the head-mounted display device is equipped with one or more cameras to provide a field of view to the user though a display positioned in front of the eyes of the user.

8. A portable air purification apparatus comprising:
a power module;
a first air compression module;
at least one selectable activation state filtering module, wherein the activation state of the filtering module is in response to a signal received by one or more processors; wherein the modules are configured to connect to with one another so that the power module distributes electrical energy to the air compression module and the air compression module distributes compressed air to the filtering module;
wherein the power module, the first air compression module and the at least one selectable activation state filtering module are integrated into a mask configured to be fitted over the nose and mouth of a wearer.

While the invention has been particularly shown and described with reference to a preferred embodiment thereof, it will be understood by those skilled in the art that various changes in form and details may be made therein without departing from the spirit and scope of the invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter of the present invention have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Publications and references to known registered marks representing various systems are cited throughout this application, the disclosures of which are incorporated herein by reference. Citation of the above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

The above descriptions of embodiments of the present invention are not intended to be exhaustive or to limit the systems and methods described to the precise form disclosed. While specific embodiments of, and examples for, the apparatus are described herein for illustrative purposes, various equivalent modifications are possible within the scope of other articles and methods, as those skilled in the relevant art will recognize. The teachings of articles and methods provided herein can be applied to other devices and arrangements, not only for the apparatus and methods described above.

The elements and acts of the various embodiments described above can be combined to provide further embodiments. These and other changes can be made to the apparatus and methods in light of the above detailed description.

What is claimed is:

1. A wearable air purification apparatus comprising:
   an air supply module configured to provide a stream of compressed air;
   at least one toxin sensor configured to evaluate an ambient environment for a presence of at least one toxin and generate a toxin signal in response to a detected presence of the at least one toxin;
   one or more control processors configured to receive the toxin signal from the at least one toxin sensor;
   a facial mask;
   an air supply conduit, wherein the air supply conduit comprises:
   one or more integrated membrane filter devices, wherein at least one of the one or more integrated membrane filter devices comprises an air impermeable flexible encasement having a first interface and a second interface, the first interface configured to be selectively coupled to the air supply module and the second interface configured to be selectively coupled to the facial mask, one or more membrane filtering materials provided within the air impermeable flexible encasement suitable for filtering one or more contaminants from the stream of compressed air, wherein each end of the one or more membrane filtering materials is in communication with the first interface such that at least a portion of the stream of compressed air is directed into a central lumen of the one or more membrane filtering materials;
   an oxygen liberation device, the oxygen liberation device selectably activated by an oxygen generation signal from the one or more control processors, wherein the one or more control processors are configured to generate the oxygen generation signal in response to receiving the toxin signal from the at least one toxin sensor, comparing the detected toxin against a list of toxins filterable by the at least one of the one or more integrated membrane filter devices,
   and determining that the detected toxin is not suitable for filtering by the at least one of the one or more integrated membrane filter devices, the oxygen liberation device further incorporating an oxygen sequestration compound, a heating element, an oxygen sensor and a temperature sensor, wherein the heating element is selectively activated to heat the oxygen sequestration compound in response to the oxygen generation signal from the one or more control processors; and
   an electronically activated valve integrated into the facial mask, wherein the electronically activated valve is controlled in response to a signal generated by at least one biometric sensor configured to measure a biometric condition correlated to exhalation.

2. The wearable air purification apparatus of claim 1, wherein the one or more membrane filtering materials each has an exterior and interior surface, the interior surface defining the central lumen, and the air impermeable flexible encasement is disposed over the exterior of the one or more membrane filtering materials;
wherein the air impermeable flexible encasement encloses a volume.

3. The wearable air purification apparatus of claim 1, further comprising a plurality of environmental sensors configured to communicate with the one or more control processors, the one or more control processors configured to execute code therein; to monitor in real-time an internal pressure level of the one or more membrane filtering materials or a concentration of the one or more contaminants as measured by one or more of the plurality of environmental sensors.

4. The wearable air purification apparatus of claim 3, wherein the air supply conduit includes at least one selectable activation state filtering module, wherein an activation state of the at least one selectable activation state filtering module is set in response to a signal received by the one or more control processors.

5. The wearable air purification apparatus of claim 4, wherein the first or the second interface are further configured with a securing valve configured to automatically close upon decoupling of the first or second interface.

6. The portable air purification apparatus of claim 1, further comprising:
at least a second integrated membrane filter device, the second integrated membrane filtering device comprising:
an air impermeable flexible encasement having an encasement input end to receive compressed air, an encasement output end to expel compressed air and an outflow interface disposed on a surface of the air impermeable flexible encasement;
a hollow filter element disposed within the encasement so as to provide a space between the encasement and the hollow filter element, the hollow filter element coupled to the encasement input end and the encasement output end, so as to allow a passage of air from the encasement input end to the encasement output end; and
wherein the outflow interface is coupled to one of a first interface of an additional integrated membrane filter device interface or the facial mask.

7. A portable air purification apparatus comprising:
an air supply module configured to provide a stream of compressed air;
at least one toxin sensor configured to evaluate an ambient environment for a presence of at least one toxin and generate a toxin signal in response to a detected presence of the at least one toxin;
one or more control processors configured to receive the toxin signal from the at least one toxin sensor;
a facial mask configured to be fitted over a nose and mouth of a wearer;
an air supply conduit, wherein the air supply conduit comprises at least one integrated filter device, the at least one integrated filter device having a first interface and a second interface, the first interface configured to be selectively coupled to the air supply module and the second interface configured to be selectively coupled to the facial mask, a flexible housing disposed between the first interface and the second interface, the flexible housing containing one or more filtering materials suitable for filtering one or more contaminants from the stream of compressed air, wherein at least one of the one or more filtering materials includes a plurality of membrane filter fibers having an open end and a closed end, wherein the open end of the plurality of membrane filter fibers is in communication with the first interface such that at least a portion of the stream of compressed air is directed into a central lumen of the plurality of membrane filter fibers;
an electronically activated valve integrated into the facial mask, wherein the electronically activated valve is controlled in response to a signal generated by at least two biometric sensors configured to measure at least two biometric conditions correlated to an exhalation of the wearer; and
an oxygen liberation device, the oxygen liberation device selectably activated by an oxygen generation signal, wherein the oxygen generation signal is generated by the one or more control processors, wherein the one or more control processors are configured to generate the oxygen generation signal in response to receiving the toxin signal from the at least one toxin sensor, comparing the detected toxin against a list of toxins filterable by the at least one of the one or more integrated membrane filter devices, and determining that the detected toxin is not suitable for filtering by the at least one integrated filter device, the oxygen liberation device further incorporating an oxygen sequestration compound, a heating element, an oxygen sensor and a temperature sensor, wherein the heating element is selectively activated to heat the oxygen sequestration compound in response to the oxygen generation signal.

8. The apparatus of claim 7, wherein the oxygen sequestration compound is selected from 2-aminoterephthalato-linked deoxy system, [{(bpbp)Co2II(NO3)}2(NH2bdc)](NO3)2.2H2O (bpbp-=2,6-bis(N,N-bis(2-pyridylmethyl)aminomethyl)-4-tert-butylphenolato, NH2bdc2-=2-amino-1,4-benzenedicarboxylato, or a nitrate salt thereof.

9. The apparatus of claim 7, further comprising one or more sensor devices configured to sample an internal air pressure of the at least one integrated filter device.

10. The apparatus of claim 7, wherein each of the at least one integrated filter device is configured with a check valve selectively engageable when the at least one integrated filter device is disengaged from the facial mask or the air supply conduit.

11. The apparatus of claim 7, further comprising one or more sensor devices configured to sample the stream of compressed air for a presence of the one or more contaminants, the one or more sensor devices configured to communicate with the one or more control processors.

* * * * *